US010166921B2

(12) United States Patent
Sypitkowski

(10) Patent No.: US 10,166,921 B2
(45) Date of Patent: Jan. 1, 2019

(54) BRIGHTNESS AND COLOR MATCHING VIDEO FROM MULTIPLE-CAMERA SYSTEM

(71) Applicant: Robert Bosch GmbH, Stuttgart (DE)

(72) Inventor: Greg Sypitkowski, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 15/114,252

(22) PCT Filed: Feb. 10, 2015

(86) PCT No.: PCT/US2015/015133
§ 371 (c)(1),
(2) Date: Jul. 26, 2016

(87) PCT Pub. No.: WO2015/123173
PCT Pub. Date: Aug. 20, 2015

(65) Prior Publication Data
US 2017/0166126 A1  Jun. 15, 2017

Related U.S. Application Data

(60) Provisional application No. 61/938,439, filed on Feb. 11, 2014.

(51) Int. Cl.
*H04N 5/247* (2006.01)
*B60R 1/00* (2006.01)
(Continued)

(52) U.S. Cl.
CPC .............. *B60R 1/00* (2013.01); *B60K 35/00* (2013.01); *B60R 1/12* (2013.01); *G06K 9/00791* (2013.01);
(Continued)

(58) Field of Classification Search
None
See application file for complete search history.

(56) References Cited

U.S. PATENT DOCUMENTS 6,972,796 B2  12/2005  Katta et al.
8,350,923 B2   1/2013  Nakayama et al.
(Continued)

FOREIGN PATENT DOCUMENTS

CN     1788486 A    6/2006
CN   101371271 A    2/2009
(Continued)

OTHER PUBLICATIONS

International Search Report and Written Opinion for Application No. PCT/US2015/015133 dated Apr. 17, 2015 (11 pages).
(Continued)

*Primary Examiner* — Michael J Hess
(74) *Attorney, Agent, or Firm* — Michael Best & Friedrich LLP

(57) ABSTRACT

Systems and methods for adjusting color and brightness in multi-camera systems are disclosed. The system uses four cameras, having overlapping fields of view, mounted on the four sides of a vehicle. Color errors are determined for areas where the images from the rear and side cameras' fields of view overlap. Color gain factors are determined and applied for each of the side cameras (using the rear camera as "master") to match the colors of the video outputs from the side cameras and the rear camera. The gains for the front view camera are then adjusted using gain factors based on the matched video outputs from the side view cameras using the side cameras as the "master" to the front camera "slave." In this way, the rear camera indirectly acts as the master for the front camera and all cameras are ultimately color-matched to the rear camera.

10 Claims, 7 Drawing Sheets

(51) Int. Cl.
*G06K 9/00* (2006.01)
*G06K 9/46* (2006.01)
*G06T 7/00* (2017.01)
*G06K 9/62* (2006.01)
*H04N 9/64* (2006.01)
*H04N 5/235* (2006.01)
*B60R 1/12* (2006.01)
*B60K 35/00* (2006.01)

(52) U.S. Cl.
CPC ......... *G06K 9/4652* (2013.01); *G06K 9/4671* (2013.01); *G06K 9/6215* (2013.01); *G06T 7/0002* (2013.01); *H04N 5/2352* (2013.01); *H04N 5/247* (2013.01); *H04N 9/646* (2013.01); *B60K 2350/1088* (2013.01); *B60K 2350/2008* (2013.01); *B60K 2350/2013* (2013.01); *B60K 2350/2017* (2013.01); *B60K 2350/2069* (2013.01); *B60R 2001/1253* (2013.01); *B60R 2300/102* (2013.01); *B60R 2300/105* (2013.01); *B60R 2300/303* (2013.01); *G06K 2009/4666* (2013.01)

(56) References Cited

U.S. PATENT DOCUMENTS

| | | | |
|---|---|---|---|
| 2002/0047901 A1* | 4/2002 | Nobori | B60R 1/00 348/149 |
| 2003/0095193 A1* | 5/2003 | May | G03B 37/02 348/231.3 |
| 2007/0285282 A1* | 12/2007 | Nakayama | B60R 1/00 340/937 |
| 2009/0015689 A1* | 1/2009 | Murayama | H04N 13/0025 348/229.1 |
| 2011/0234807 A1 | 9/2011 | Jones et al. | |
| 2012/0002050 A1 | 1/2012 | Taniguchi et al. | |
| 2012/0169842 A1 | 7/2012 | Chuang et al. | |
| 2012/0206565 A1 | 8/2012 | Villmer | |
| 2012/0209287 A1* | 8/2012 | Zhao | H04N 1/6027 606/130 |
| 2013/0107048 A1 | 5/2013 | Rottner et al. | |
| 2013/0208140 A1 | 8/2013 | Quast et al. | |
| 2014/0078247 A1* | 3/2014 | Shohara | H04N 9/735 348/38 |

FOREIGN PATENT DOCUMENTS

| | | |
|---|---|---|
| CN | 102273201 A | 12/2011 |
| CN | 102387371 A | 3/2012 |
| CN | 102714710 A | 10/2012 |
| JP | H1155682 A | 2/1999 |
| JP | 2007323587 A | 12/2007 |
| WO | 2011082716 A1 | 7/2011 |
| WO | 2013086249 A2 | 6/2013 |

OTHER PUBLICATIONS

Office Action from the State Intellectual Property Office of the People's Republic of China for Application No. 201580007923.2 dated May 25, 2018 (18 pages).

* cited by examiner

BRIGHTNESS AND COLOR MATCHING VIDEO FROM MULTIPLE-CAMERA SYSTEM

RELATED APPLICATIONS

This application claims the benefit of U.S. Provisional Application No. 61/938,439, filed Feb. 11, 2014, the entire contents of which are incorporated herein by reference.

BACKGROUND

The present invention relates to systems and methods for matching cameras in multiple-camera surround view systems in vehicles.

SUMMARY

In one embodiment, the invention provides a surround view system for a vehicle. The system includes a first camera, a second camera, a third camera, and a controller, all deployed on a vehicle. The first camera is positioned on the vehicle to capture a first video image including a first region of interest. The second camera is positioned on the vehicle to capture a second video image including a second region of interest. The second camera is positioned such that the first region of interest at least partially overlaps with the second region of interest. The third camera is positioned on the vehicle to capture a third video image including a third region of interest. The third camera is positioned such that the third region of interest at least partially overlaps with the second region of interest. The controller receives the first video image and the second video image, and determines a first overlap region, which includes a portion of the first video image where the first region of interest overlaps with the second region of interest. The controller then determines a first color error for the second camera, indicative of a color difference between the first video image and the second video image within the first overlap region. The controller then determines a first color gain factor for the second camera based on the first color error, and applies the first color gain factor to generate a first adjusted video input stream for the second camera to reduce the first color error. The controller then receives an adjusted second video image from the second camera including an adjusted second region of interest, and the third video image. The controller then determines a second overlap region, which includes a portion of the third video image where the third region of interest overlaps with the adjusted second region of interest. The controller then determines a second color error for the third camera, indicative of a second color difference between the third video image and the adjusted second video image within the second overlap region. The controller then determines a second color gain factor for the third camera based on the second color error, and applies the second color gain factor to generate a second adjusted video input stream for the third camera to reduce the second color error.

In another embodiment, the invention provides a method for correcting color in multiple-camera systems. The method includes receiving, from a first camera positioned on a vehicle, a first video image including a first region of interest; and receiving, from a second camera positioned on the vehicle, a second video image including a second region of interest, where the second camera is positioned such that the first region of interest at least partially overlaps with the second region of interest. The method further includes determining, by a controller, a first overlap region, which includes a portion of the first video image where the first region of interest overlaps with the second region of interest. The method further includes determining, by the controller, a first color error for the second camera, which is indicative of a color difference between the first video image and the second video image within the first overlap region. The method further includes determining, by the controller, a first color gain factor for the second camera based on the first color error, and applying the first color gain factor to generate a first adjusted video input stream for the second camera to reduce the first color error. The method further includes receiving, from the second camera, an adjusted second video image including an adjusted second region of interest and receiving, from a third camera positioned on the vehicle, a third video image corresponding to a third region of interest, the third camera positioned such that the third region of interest at least partially overlaps with the adjusted second region of interest. The method further includes determining, by the controller, a second overlap region, the second overlap region including a portion of the third video image where the third region of interest overlaps with the adjusted second region of interest. The method further includes determining, by the controller, a second color error for the third camera, the second color error being indicative of a second color difference between the third video image and the adjusted second video image within the second overlap region. The method further includes determining, by the controller, a second color gain factor for the third camera based on the second color error; and applying the second color gain factor to generate a second adjusted second video input stream for the third camera to reduce the second color error.

In some embodiments, the controller will repeat the steps of determining a first color error and determining a first color gain factor for each of a group of colors consisting of red, green, and blue to produce a first red gain factor, a first green gain factor, and a first blue gain factor, and apply the first red gain factor, the first green gain factor, and the first blue gain factor to generate a first adjusted video input stream for the second camera, which reduces the first color error.

In some embodiments, the controller will repeat the steps of determining a second color error and determining a second color gain factor for each of a group of colors consisting of red, green, and blue to produce a second red gain factor, a second green gain factor, and a second blue gain factor, and apply the second red gain factor, the second green gain factor, and the second blue gain factor to generate a second adjusted video input stream for the third camera, which reduces the second color error.

In some embodiments, the controller adjusts the first color gain factor and the second color gain factor such that they are lesser than a maximum threshold and greater than a minimum threshold.

In some embodiments, the minimum and maximum thresholds for one gain factor are based on the values of the other gain factors.

In some embodiments, the controller changes a plurality of $YC_bC_r$ to RGB color space conversion coefficients for the first and second adjusted video streams.

In some embodiments of the invention, the controller applies a brightness gain to the first camera based on an average brightness.

Other aspects of the invention will become apparent by consideration of the detailed description and accompanying drawings.

DETAILED DESCRIPTION

Figure 1:
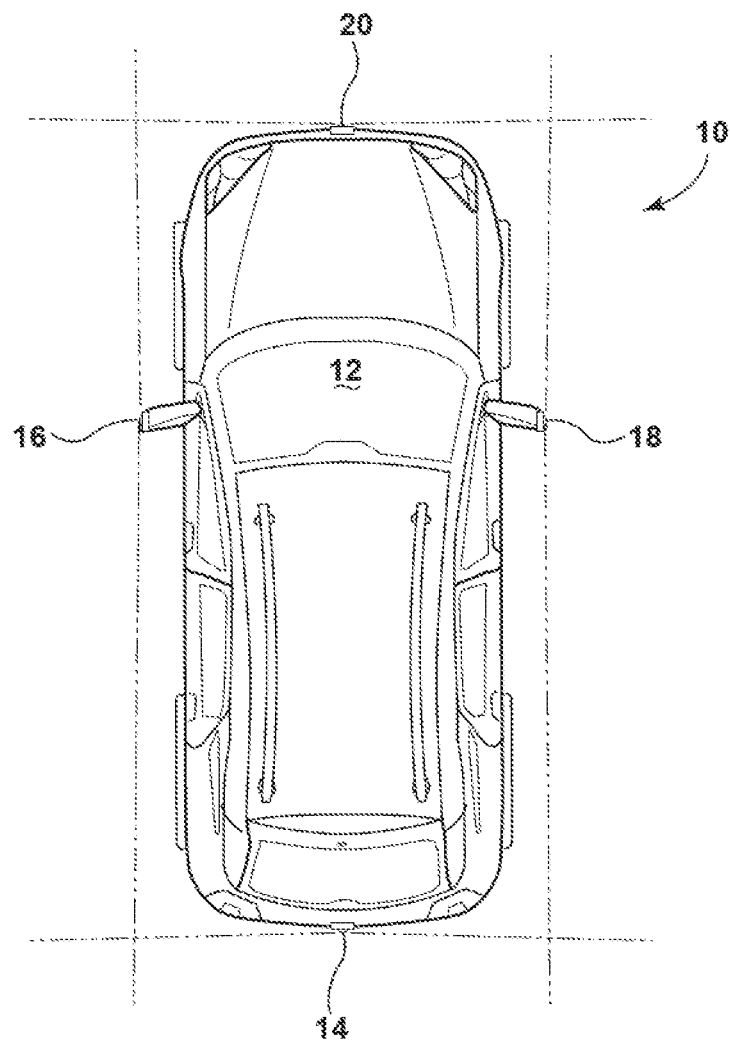
FIG. 1 is an overhead view of a vehicle with multiple-camera surround view system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further. "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include standard processing components, such as one or more processors, one or more memory modules including non-transitory computer-readable medium, one or more input/output interfaces, and various connections (e.g., a system bus) connecting the components.

In a vehicle that is equipped with multiple cameras, visual information is displayed for a user. If video images are compiled in an effective manner and presented properly, maneuvering of the vehicle is improved. However, due to differences in cameras and variances in environmental conditions, the video images provided by similarly configured cameras can display disparate brightness and colors. Even minor variations in the images' brightness and color are very noticeable when displaying the video images adjacent to one another, e.g., when the images are stitched together to create a single panoramic or surround view. The displayed video images can be distracting to a user and limit the effectiveness of the display.

FIG. 1 illustrates a vehicle 12 equipped with a multiple-camera system 10. The multiple-camera system 10 includes a rear camera 14 positioned with a field of view behind the vehicle, a left camera 16 positioned with a field of view to the left of the vehicle, a right camera 18 positioned with a field of view to the right of the vehicle, and a front camera 20 positioned with a field of view to the front of the vehicle. Depending on the placement of each camera and the lens used, the field of view for each camera can be up to 180°.

Figure 2:
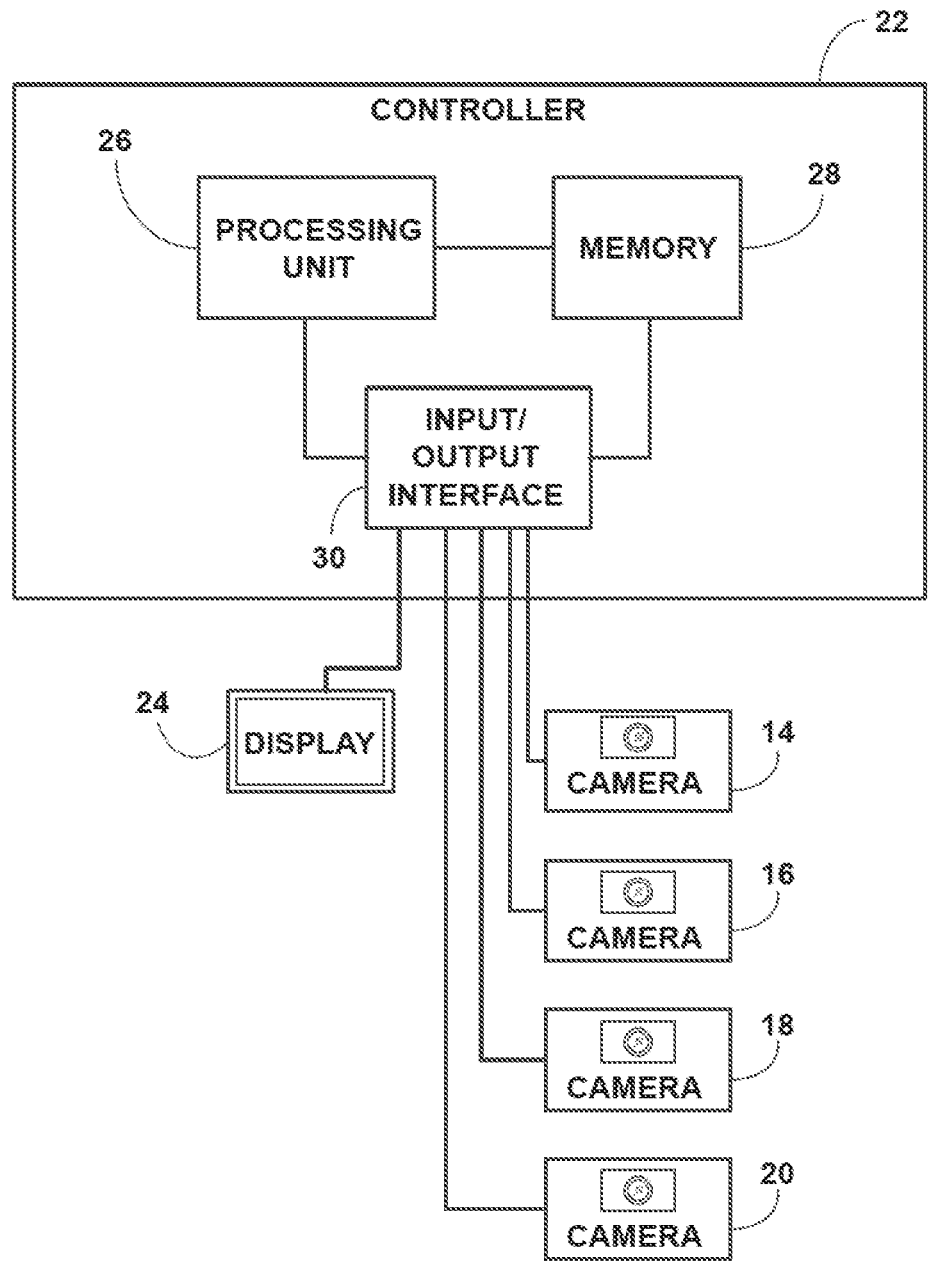
FIG. 2 is a schematic illustration of the multiple-camera surround view system of FIG. 1.

FIG. 2 illustrates various interconnected components of the multiple camera system 10. The system includes a controller 22 with a processing unit 26 (e.g., a microprocessor, application specific integrated circuit, etc.), a non-transitory computer-readable memory 28, and an input/output interface 30. The computer-readable memory 28 stores image data and computer-executable instructions that, when executed by the processing unit, provide the system functionality described below. The computer-readable memory 28 can include random access memory ("RAM") and/or read-only memory ("ROM"). The input/output interface 30 transmits and receives information from devices external to the controller 22. The controller 22 receives image data from the cameras 14, 16, 18, 20 (e.g., over one or more wired and/or wireless connections), processes the image data, and transmits video display images to a display 24 positioned in the interior of the vehicle. The controller 22 can also use the input/output interface 30 to communicate with other controllers and devices included in the vehicle 12, such as console or dashboard controller that provides other information to a driver of the vehicle 12.

Figure 3:
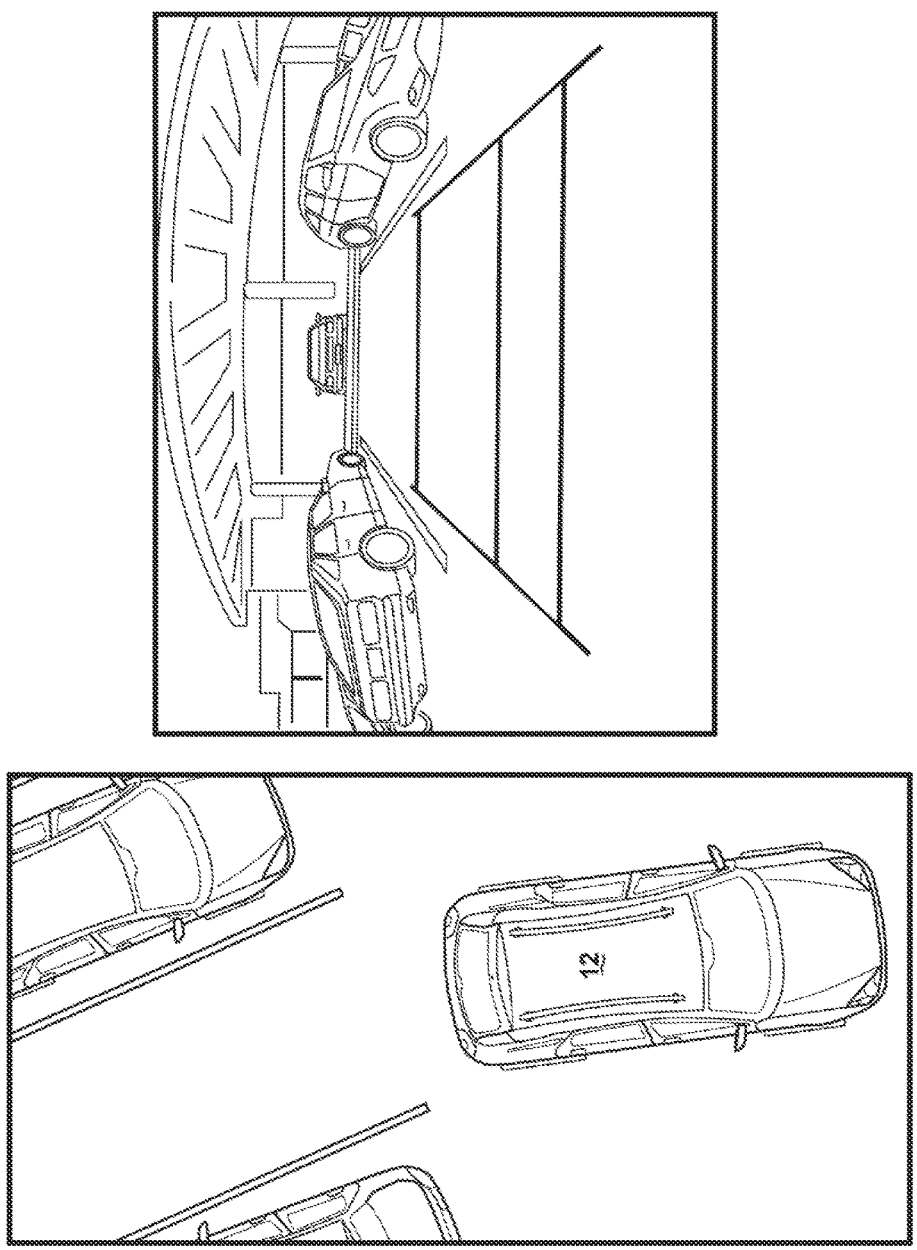
FIG. 3 is a user interface generated and displayed by the multiple-camera surround view system of FIG. 2 showing an overhead view of a vehicle and a corresponding rear view image.

The controller 22 applies one or more image processing routines to the image data received from the cameras 14, 16, 18, 20 to generate one or more display images. For example, FIG. 3 shows a pair of images generated by the controller 22 based on image data received from the cameras 14, 16, 18, 20. As noted above, each camera 14, 16, 18, 20 is positioned on the vehicle to have a different field of view that partially overlaps with the fields of view of two adjacent cameras. The image on the right of FIG. 3 is displayed to the driver of the vehicle 12 to show the area immediately behind the vehicle. This image is generally displayed when the vehicle is in a reverse gear and is used to assist the driver of the vehicle while moving the vehicle backwards.

The controller 22 is also configured to process the image data received from the cameras 14, 16, 18, 20 and stitch them together to create a simulated overhead view of the vehicle 12 in its surroundings (a surround view) as shown in the left-side image of FIG. 3. The two images of FIG. 3 can be shown on the display simultaneously (e.g., side-by-side as shown in FIG. 3) or each image can be shown separately depending, for example, on the preferences of the driver.

As noted above, for a multi-camera surround view application with "stitched" camera images, matching color and brightness is of great importance for adjacent cameras. Unmatched cameras will detract from the surround view homogeneity regardless of the consistency of the stitched images. The cameras 14, 16, 18, 20 desirably have a "free-running" camera video source and the video streams are matched by the controller 22. Because the cameras 14, 16, 18, 20 are free-running cameras, they must be configured to provide an optimized image. Configuring the cameras 14, 16, 18, 20 for internal Auto-White Balance (AWB) and Auto-Exposure (AE) allows the cameras to maximize the limited data bandwidth of the video stream.

Figure 4A:
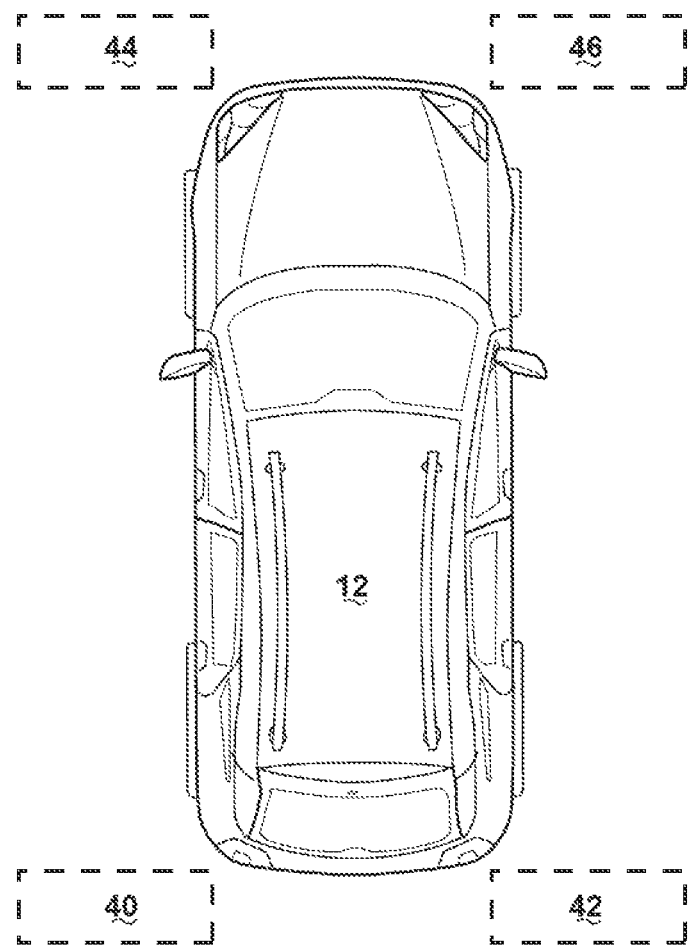
FIG. 4A is an overhead view of a vehicle having a plurality of cameras with overlapping fields of view.

FIGS. 4A-4E further illustrate the mechanism by which the image data from each of the cameras 14, 16, 18, 20 is stitched together and then used to perform optimized color matching. FIG. 4A shows the overhead view of the vehicle—an image that is generated by the controller 22 and displayed to the driver of the vehicle. As noted above, each camera 14, 16, 18, 20 is positioned on the vehicle with a different field of view. The field of view of each respective camera includes a portion of the ground. The image data from each respective camera is processed by the controller 22 to generate a simulated overhead view of at least a portion of the ground within the field of view of the camera. This ground portion is referred to herein as a "region of interest" for each respective camera.

Figure 4B:
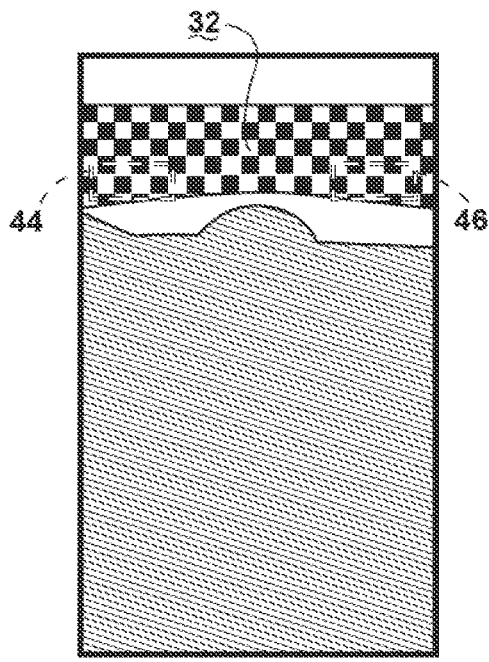
FIG. 4B is an overhead view of a region of interest for a front camera of the vehicle of FIG. 4A.
Figure 4C:
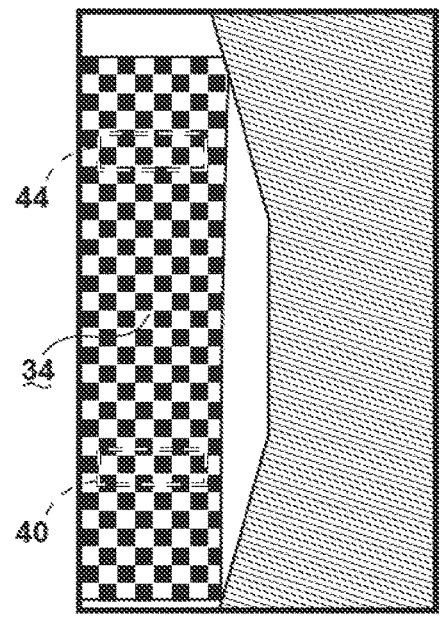
FIG. 4C is an overhead view of a region of interest for a left side camera of the vehicle of FIG. 4A.
Figure 4D:
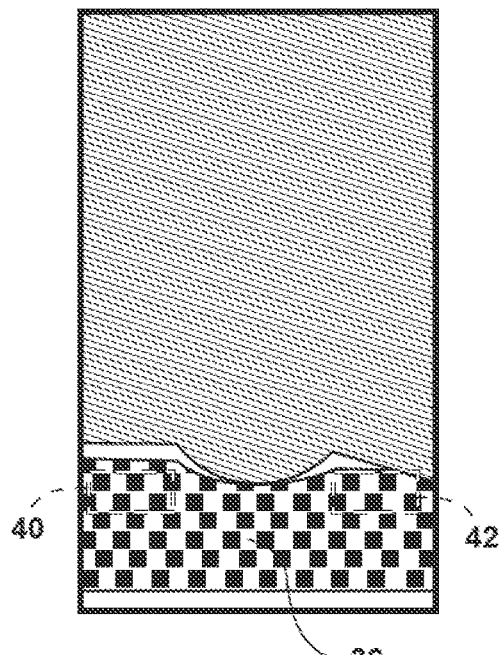
FIG. 4D is an overhead view of a region of interest for a rear camera of the vehicle of FIG. 4A.
Figure 4E:
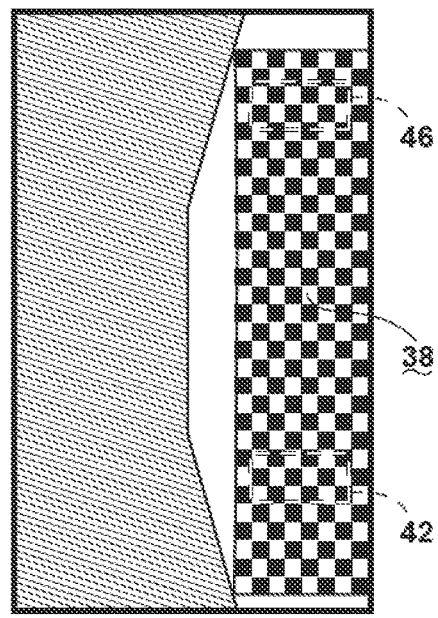
FIG. 4E is an overhead view of a region of interest for a right side camera of the vehicle of FIG. 4A.

FIG. 4B shows the region of interest 32 for the front vehicle camera 20—this region of interest 32 corresponds to at least a portion of the ground that is within the field of view of the front camera 20. Similarly, FIG. 4C shows the region of interest 34 for the left side camera 16, FIG. 4D shows the region of interest 36 for the rear vehicle camera 14, and FIG. 4E shows the region of interest 38 for the right side camera 18. As noted above, the cameras 14, 16, 18, 20 are positioned such that the field of view for each camera overlaps with the field of view of the two adjacent cameras. As a result, the respective regions of interest will also overlap. For example, the area identified in FIGS. 4A-4E as area 40 are included in both the rear vehicle region of interest 36 and the left side region of interest 34. Similarly, area 42 is included in both the rear vehicle region of interest 36 and the right side region of interest 38, area 44 is included in both the front vehicle region of interest 32 and the left side region of interest 34, and area 46 is included in both the front vehicle region of interest 32 and the right side region of interest 38. The controller 22 combines these processed overhead views of each respective region of interest and inserts a simulated image of the vehicle to generate a simulated overhead view of the vehicle and its surrounding such as shown in FIGS. 3 and 4A.

The exposure and white balance of the image data is limited to the regions of interest thereby allowing adjacent cameras to match more closely because the regions of interest look very similar. However, this approach can lead to color or brightness mismatches. For example, a yellow line in the center of a road can have a significant effect on the color or exposure for a camera viewing that portion of the road. To address these color or brightness variations, the system 10 takes advantage of areas within the overlapping portions of adjacent regions of interest (e.g., areas 40, 42, 44, and 46) to perform color matching.

Figure 5:
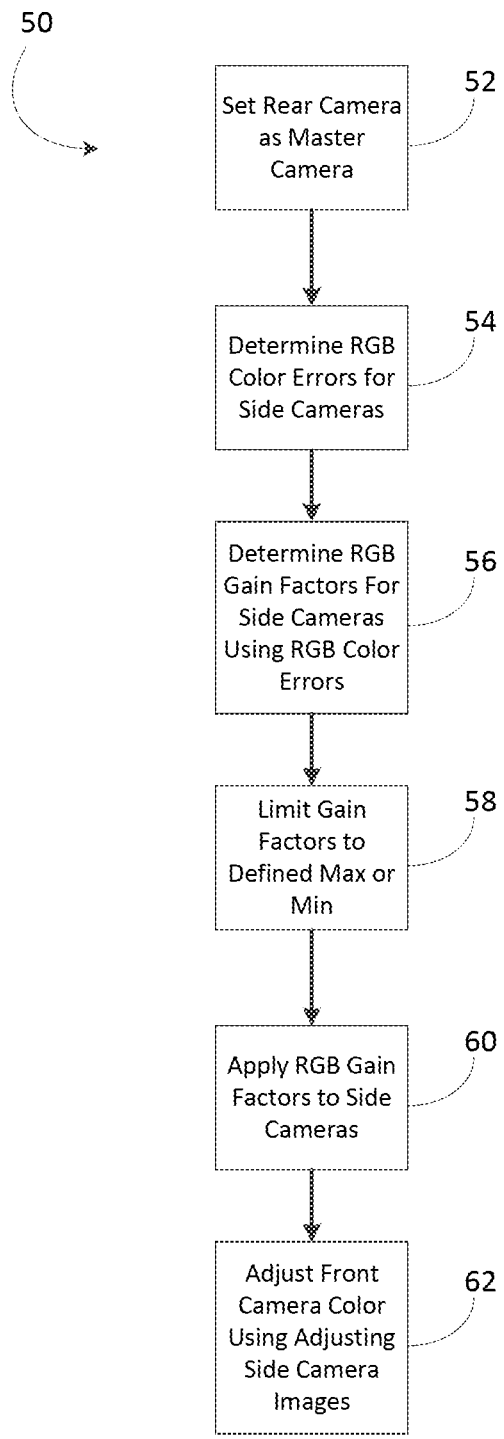
FIG. 5 is a flow chart of a method for matching color and brightness for the video images from the cameras of FIG. 1.

FIG. 5 illustrates an example of one such color-matching routine that adjusts for individual color component errors in overlapping portions 40, 42, 44, 46 where video images from two cameras are combined to create the simulated overhead surround image. The controller 22 of system 10 matches brightness and color for the multiple cameras in a surround view system for a vehicle. In operation, the controller designates one camera as a "Master" (at step 52). In this example, the rear view camera 14 is designated as the "Master", though another camera may be selected instead. This method matches the brightness and color for the other cameras 16, 18, 20 to the brightness and color of the Master camera 14 by comparing overlapping areas in each region of interest (e.g., areas 40, 42, 44, 46 of FIGS. 4A-4E).

The brightness and color matching occurs in two stages. In the first stage, the side view cameras 16, 18 are each adjusted individually based on the video images from the rear view camera 14. Using the RGB color model, pixels in video images include three color components—red (R), green (G), and blue (B). The area shared by the rear region of interest 36 and the left side region of interest 34 (i.e., area 40) is analyzed to determine color error between the image data from the rear camera 14 and the image data from the left side camera 16 for each RGB color component, $C_s\text{err}_r$, $C_s\text{err}_g$, and $C_s\text{err}_b$ (at step 54). This error calculation is performed concurrently for both side regions of interest 34, 38 with the rear camera serving as "master" for both side cameras.

The following equation is used to determine the individual color errors for each side cameras:

$$C_s\text{err}_{rgb} = C_m\text{avg}_{rgb} - C_s\text{avg}_{rgb} \quad (1)$$

Where $C_s\text{err}_{rgb}$ is the side camera RGB color error (i.e., "slave" color error), $C_m\text{avg}_{rgb}$ is the average RGB color value from the overlapping region of the master camera, and $C_s\text{avg}_{rgb}$ is the average RGB color value from the overlap region of the slave camera.

Next, the controller uses the color errors to determine color gain factors, $C_s\text{gain}_r$, $C_s\text{gain}_g$, and $C_s\text{gain}_b$ (one for each color component) are calculated for each of the side cameras 16, 18 (at step 56). The controller 22 uses the following equation to determine the gain factors for the side cameras:

$$C_s\text{gain}_{rgb} = C_s\text{gain}_{rbg0} * (1 + (C_s\text{err}_{rgb}/Kp)) \quad (2)$$

Where $C_s\text{gain}_{rgb}$ is the slave camera gain factor, $C_s\text{gain}_{rgb0}$ is the gain factor from the previous iteration (initialized to 1), $C_s\text{err}_{rgb}$ is the color error (as calculated in step 54), and Kp is a gain scale factor. The controller 22 iteratively performs this determination, each time using the $C_s\text{err}_{rgb}$ from the previous iteration. As the gain is adjusted, the color error will eventually approach zero and no further adjustments would be necessary.

To prevent unstable operation, the controller 22 limits the gain factors for each camera to a defined maximum or minimum (at step 58) using the following equations:

If the $C_s\text{gain}_{rgbCALC} \geq \text{GAIN\_MAX}$, then
$$C_s\text{gain}_{rgb} = \text{GAIN\_MAX} \quad (3)$$

If $\text{GAIN\_MIN} < C_s\text{gain}_{rgbCALC} < \text{GAIN\_MAX}$, then
$$C_s\text{gain}_{rgb} = C_s\text{gain}_{rgbCALC} \quad (4)$$

If $C_s\text{gain}_{rgbCALC} < \text{GAIN\_MIN}$, then
$$C_s\text{gain}_{rgb} = \text{GAIN\_MIN} \quad (5)$$

where, GAIN_MAX is the maximum Gain Factor allowed, GAIN_MIN is the minimum Gain Factor allowed, $C_s\text{gain}_{rgbCALC}$ is the gain factor determined in step 56, and $C_s\text{gain}_{rgb}$ is the gain factor that will be applied to the camera image data.

After appropriate gain factors are determined for each color component for each side camera, the controller 22 applies the gain factors to the video input streams from the side cameras 16, 18 thereby adjusting the RGB color levels of the images captured by the side cameras 16, 18 to match the colors of the rear camera 14 image (at step 60). These gain factors are applied on the individual video input streams by changing the $YC_bC_r$ to RGB color space conversion coefficients. The incoming video images from the cameras 14, 16, 18, 20 are represented by Y, Cb, and Cr values. The controller 22 can use the following equations to convert the YCbCr stream into RGB values for each pixel using the calculated gain factors. The full video stream color transformation operation is shown below.

$$Val_r = \text{int}((C_s\text{gain}_r * 298) * Y)/8) + \text{int}((C_s\text{gain}_r * 409) * Cr)/8) \quad (6)$$

$$Val_g = \text{int}((C_s\text{gain}_g * 298) * Y)/8) + \text{int}((C_s\text{gain}_g * -100) * Cb)/8) + \text{int}((C_s\text{gain}_g * -208) * Cr)/8) \quad (7)$$

$$Val_b = \text{int}((C_s\text{gain}_b * 298) * Y)/8) + \text{int}((C(\text{gain}_b * 512) * Cb)/8) \quad (8)$$

RGB values have a range from 0 to 255. If the conversion equations above produce values outside that range, the values are adjusted as follows:

$$\text{If } Val_{rgbCALC} > 255, \text{ then } Val_{rgb} = 255 \quad (9)$$

$$\text{If } 0 >= Val_{rgbCALC} <= 255, \text{ then } Val_{rgb} = Val_{rgbCALC} \quad (10)$$

$$\text{If } Val_{rgbCALC} < 0, \text{ then } Val_{rgb} = 0 \quad (11)$$

where $Val_{rgbCALC}$ is one of $Val_r$, $Val_g$, or $Val_b$ determined above, and $Val_{rgb}$ is the actual value of $Val_r$, $Val_g$, or $Val_b$ that will be used by the controller 22 in the color transformation operation.

After gain factors are determined and applied for each of the side cameras (using the rear vehicle camera as "master"), the system proceeds to the second stage where the gains for the front view camera 20 are adjusted using gain factors based on the adjusted video images from the side view cameras 16, 18 (at step 62). The controller 22 performs this adjustment using the same methods described above with one of the side cameras being used as "master" and the front camera being the "slave." In this way, the rear camera 14 indirectly acts as the master for the front camera 20 and the front camera 20 is ultimately color-matched to the rear camera 14. However, it takes an extra clock cycle or frame for changes to the side cameras 16, 18 gain settings (based on the rear camera color palate) to affect the front camera 20 gain settings.

The gain settings of the camera designated as a master camera are not changed using this method. The gain factor is always applied to the default color space coefficients. Other configurations of the system 10 adjust the color of the master camera prior to adjusting the other cameras.

It should be noted that when the master camera utilizes internal AE/AWB to normalize the video scene such that the images have a bimodal histogram, the result can lead to darkness in the surround view. Since the master rear view camera controls the brightness of the remaining cameras, the average RGB values used as the control set point may be dark and tend to lead to an overall darker image. If the method 50 were enabled, the side view cameras 16, 18 would be made darker due to the darker rear view camera 14 video image in the regions of interest.

In those situations, results can be improved by selecting a "better" camera master or by applying a brightness gain to the master rear view camera based on the average brightness of all the vehicle mounted cameras. This processing by the controller 22 minimizes the gains for the multiple-camera system and maintains the system as close to nominal as possible.

In most situations when two adjacent cameras are looking at the ground plane, it may be appropriate to assume that the two camera video images are very similar. However, there are situations when one camera sees objects that the other camera does not. This can lead to inappropriate gain calculations. A solution for this type of scenario is to either limit the gains based on the other gains (e.g., make sure the red gain is not too much greater than the blue or green gain) or by having the controller 22 intelligently adjust the overlapping portion of the region of interest.

Figure 6:
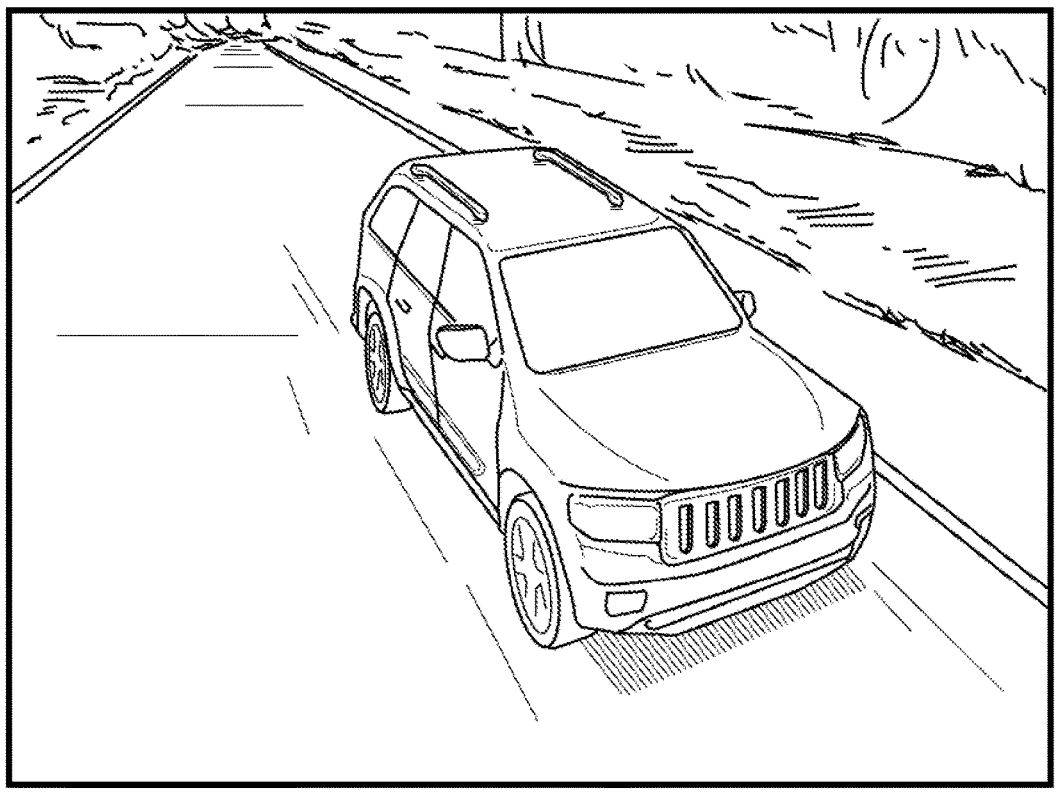
FIG. 6 is display image generated and displayed by the system of FIG. 1 showing a front 3D virtual perspective view of a SUV vehicle.

Although the examples discussed above perform color matching to generate a simulated overhead view, these techniques may also be applied while generating other simulated perspective images using image data from multiple cameras. For example, some systems are configured to utilize multiple concatenated camera views to generate a 3D perspective image such as shown in FIG. 6. When generating 3D perspectives, determining the overlapping portion of the region of interest is more complicated and, therefore, matching the cameras requires care. In 3D perspectives, an alpha blending command mask determines conditions for an overlap region. In the analog surround view system of the invention, an alpha blending command mask may determine the overlap region and utilize the overlap region to control the brightness and color of the cameras. However, this arrangement may be subjected to inaccuracies due to differences in the regions of interest due to the different camera perspectives.

Another possible approach for camera color matching is to take advantage of the analog forward applied inverse rectification (AFAIR) flexibility. The AFAIR module can create multiple concatenated camera views it is possible to generate a 3D perspective and a top-view perspective concurrently. When this occurs, a top perspective view is generated and buffered outside the viewable range and used to perform the camera matching in the exact same manner as in the standard top view matching. This arrangement simplifies the algorithm because there are no changes needed for any view.

In some configurations, the system 10 utilizes a NTSC video stream or a PAL video stream, and adjusts for individual RGB color component errors or individual YCbCr component errors.

Thus, embodiments of the invention provide, among other things, systems and methods for matching cameras in an analog multiple-camera surround view system for a vehicle. Various features and advantages of the invention are set forth in the following claims.

What is claimed is:

1. A surround view system for a vehicle, the system comprising:
   a first camera, positioned on the vehicle to capture a first video image including a first region of interest;
   a second camera, positioned on the vehicle to capture a second video image including a second region of interest, the second camera being positioned such that the first region of interest at least partially overlaps with the second region of interest;
   a third camera, positioned on the vehicle to capture a third video image including a third region of interest, the third camera positioned such that the third region of interest at least partially overlaps with the second region of interest;

a controller configured to
  receive the first video image;
  receive the second video image;
  determine a first overlap region, the first overlap region including a portion of the first video image where the first region of interest overlaps with the second region of interest;
  determine a first color error for the second camera, the first color error being indicative of a color difference between the first video image and the second video image within the first overlap region;
  determine a first color gain factor for the second camera based on the first color error;
  generate a first adjusted video input stream for the second camera by applying the first color gain factor to reduce the first color error;
  receive an adjusted second video image from the second camera including an adjusted second region of interest;
  receive the third video image;
  determine a second overlap region, the second overlap region including a portion of the third video image where the third region of interest overlaps with the adjusted second region of interest;
  determine a second color error for the third camera, the second color error being indicative of a second color difference between the third video image and the adjusted second video image within the second overlap region;
  determine a second color gain factor for the third camera based on the second color error; and
  generate a second adjusted video input stream for the third camera using the second color gain factor to reduce the second color error,
wherein the controller is further configured to adjust the first color gain factor and the second color gain factor such that they are lesser than a maximum threshold and greater than a minimum threshold, and
wherein the minimum threshold and the maximum threshold for one gain factor are based on the values of the other gain factors.

2. The system of claim 1, wherein the controller is further configured to
  repeat the steps of determining a first color error and determining a first color gain factor for each of a group of colors consisting of red, green, and blue to produce a first red gain factor, a first green gain factor, and a first blue gain factor; and
  generate a first adjusted video input stream for the second camera by applying the first red gain factor, the first green gain factor, and the first blue gain factor to reduce the first color error.

3. The system of claim 1, wherein the controller is further configured to
  repeat the steps of determining a second color error and determining a second color gain factor for each of a group of colors consisting of red, green, and blue to produce a second red gain factor, a second green gain factor, and a second blue gain factor; and
  generate a second adjusted video input stream for the third camera by applying the second red gain factor, the second green gain factor, and the second blue gain factor to reduce the second color error.

4. The system of claim 1, wherein the controller is further configured to change a plurality of $YC_bC_r$ to RGB color space conversion coefficients for the first and second adjusted video streams.

5. The system of claim 1, wherein the controller is further configured to apply a brightness gain to the first camera based on an average brightness.

6. A method for correcting color in multiple-camera systems, the method comprising:
  receiving, from a first camera positioned on a vehicle, a first video image including a first region of interest;
  receiving, from a second camera positioned on the vehicle, a second video image including a second region of interest, the second camera being positioned such that the first region of interest at least partially overlaps with the second region of interest;
  determining, by a controller, a first overlap region, the first overlap region including a portion of the first video image where the first region of interest overlaps with the second region of interest;
  determining, by the controller, a first color error for the second camera, the first color error being indicative of a color difference between the first video image and the second video image within the first overlap region;
  determining, by the controller, a first color gain factor for the second camera based on the first color error;
  generating a first adjusted video input stream for the second camera by applying the first color gain factor to reduce the first color error;
  receiving, from the second camera an adjusted second video image including an adjusted second region of interest;
  receiving, from a third camera positioned on the vehicle, a third video image corresponding to a third region of interest, the third camera positioned such that the third region of interest at least partially overlaps with the adjusted second region of interest;
  determining, by the controller, a second overlap region, the second overlap region including a portion of the third video image where the third region of interest overlaps with the adjusted second region of interest;
  determining, by the controller, a second color error for the third camera, the second color error being indicative of a second color difference between the third video image and the adjusted second video image within the second overlap region;
  determining, by the controller, a second color gain factor for the third camera based on the second color error; and
  generating a second adjusted second video input stream for the third camera by applying the second color gain factor to reduce the second color error,
further comprising adjusting, by the controller, the first color gain factor and the second color gain factor such that they are lesser than a maximum threshold and greater than a minimum threshold,
wherein the minimum threshold and the maximum threshold for one gain factor are based on the values of the other gain factors.

7. The method of claim 6, further comprising:
  repeating the steps of determining a first color error and determining a first color gain factor for each of a group of colors consisting of red, green, and blue to produce a first red gain factor, a first green gain factor, and a first blue gain factor; and generating a first adjusted video input stream for the second camera by applying the first red gain factor, the first green gain factor, and the first blue gain factor to reduce the first color error.

8. The method of claim 6, further comprising:
repeating the steps of determining a second color error and determining a second color gain factor for each of a group of colors consisting of red, green, and blue to produce a second red gain factor, a second green gain factor, and a second blue gain factor; and
generating a second adjusted video input stream for the third camera by applying the second red gain factor, the second green gain factor, and the second blue gain factor to reduce the second color error.

9. The method of claim 6, further comprising changing, by the controller, a plurality of $YC_bC_r$ to RGB color space conversion coefficients for the first and second adjusted video streams.

10. The method of claim 6, further comprising applying a brightness gain to the first camera based on an average brightness.

* * * * *